United States Patent [19]
Muenster

[11] Patent Number: 5,845,976
[45] Date of Patent: Dec. 8, 1998

[54] PROCESS AND DEVICE FOR OPERATING A BRAKE SYSTEM OF A VEHICLE

[75] Inventor: Marc Muenster, Gevelsberg, Germany

[73] Assignee: Robert Bosch GmbH, Stuttgart, Germany

[21] Appl. No.: 941,845

[22] Filed: Oct. 1, 1997

[30] Foreign Application Priority Data

Oct. 29, 1996 [DE] Germany .................. 196 44 880.8

[51] Int. Cl.$^6$ .................................................. B60T 8/34
[52] U.S. Cl. ........................................ 303/155; 303/113.4
[58] Field of Search .................... 303/3, 10, 15, 303/122.03, 122.06, 122.09, 122.1, 122.11, 122.13, 122.14, DIG. 2, DIG. 3, 113.4, 155

[56] References Cited

U.S. PATENT DOCUMENTS

| | | |
|---|---|---|
| 4,768,841 | 9/1988 | Watanabe .............................. 303/113.4 |
| 5,152,585 | 10/1992 | Patient et al. . |
| 5,586,814 | 12/1996 | Steiner ................................. 303/113.4 |
| 5,727,852 | 3/1998 | Pueschel et al. ..................... 303/113.4 |

FOREIGN PATENT DOCUMENTS

| | | |
|---|---|---|
| 195 01 760 | 1/1995 | Germany . |
| 1415192 | 11/1975 | United Kingdom . |
| 2127505 | 4/1984 | United Kingdom . |
| 2297134 | 7/1996 | United Kingdom . |

*Primary Examiner*—Robert J. Oberleitner
*Assistant Examiner*—Chris Schwartz
*Attorney, Agent, or Firm*—Kenyon & Kenyon

[57] ABSTRACT

A process and device for operating a brake system of a vehicle by measuring the brake pressure in a brake line appearing on an output side of a braking force amplifier and the brake pressure in a brake line between a regulating unit and wheel brakes of the vehicle. If the measured brake pressures are not within a predetermined range, a pump is activated to increase the brake pressure applied to the wheel brakes without requiring a vehicle operator to increase the mechanical pressure applied to a brake pedal.

5 Claims, 2 Drawing Sheets

PROCESS AND DEVICE FOR OPERATING A BRAKE SYSTEM OF A VEHICLE

BACKGROUND INFORMATION

In conventional brake systems for motor vehicles, the brake pressure in the vehicle wheel brake cylinders is built up by the driver's action on the brake pedal. In these systems, a braking force amplifier is provided, through which the actuation of the pedal is converted into a corresponding brake pressure. With ABS or ASR systems, additional control units are known which build up or decrease the pressure in the wheel brakes in addition to the driver's action. The control units are actuated electrically by an electronic controller according to the current operating situation.

In the event of failure of the braking force amplifier of such brake systems, normal brake operation is possible only if the driver considerably increases the force exerted on the brake pedal.

An object of the present invention is to provide a protection device for a brake system, which ensures braking even in the event of failure of the braking force amplifier.

German Patent Application No. 195 01 760 explains that the braking pressure of at least one wheel brake can be built up independently of the driver's command through pressure-generating means of an ABS/ASR/FDR system. This braking force build-up takes place when the driver quickly actuates the brake pedal, manifesting what is known as "panic braking." The brake pedal position is sensed, so that in the event of failure of the braking force amplifier, no optimum braking can take place.

SUMMARY OF THE INVENTION

The present invention ensures that braking is performed without increased application of force even if the pressure in the wheel brake is insufficient, for example, as a result of a failure of the braking force amplifier.

It is particularly advantageous that the pressure can be built up by a pressure generating means present in conjunction with an anti-block system or a traction control system.

Furthermore, it is advantageous that when the protection device according to the present invention is activated, the brake system defect is communicated to the driver, who then can immediately take the vehicle to a repair shop.

DETAILED DESCRIPTION

Figure 1:
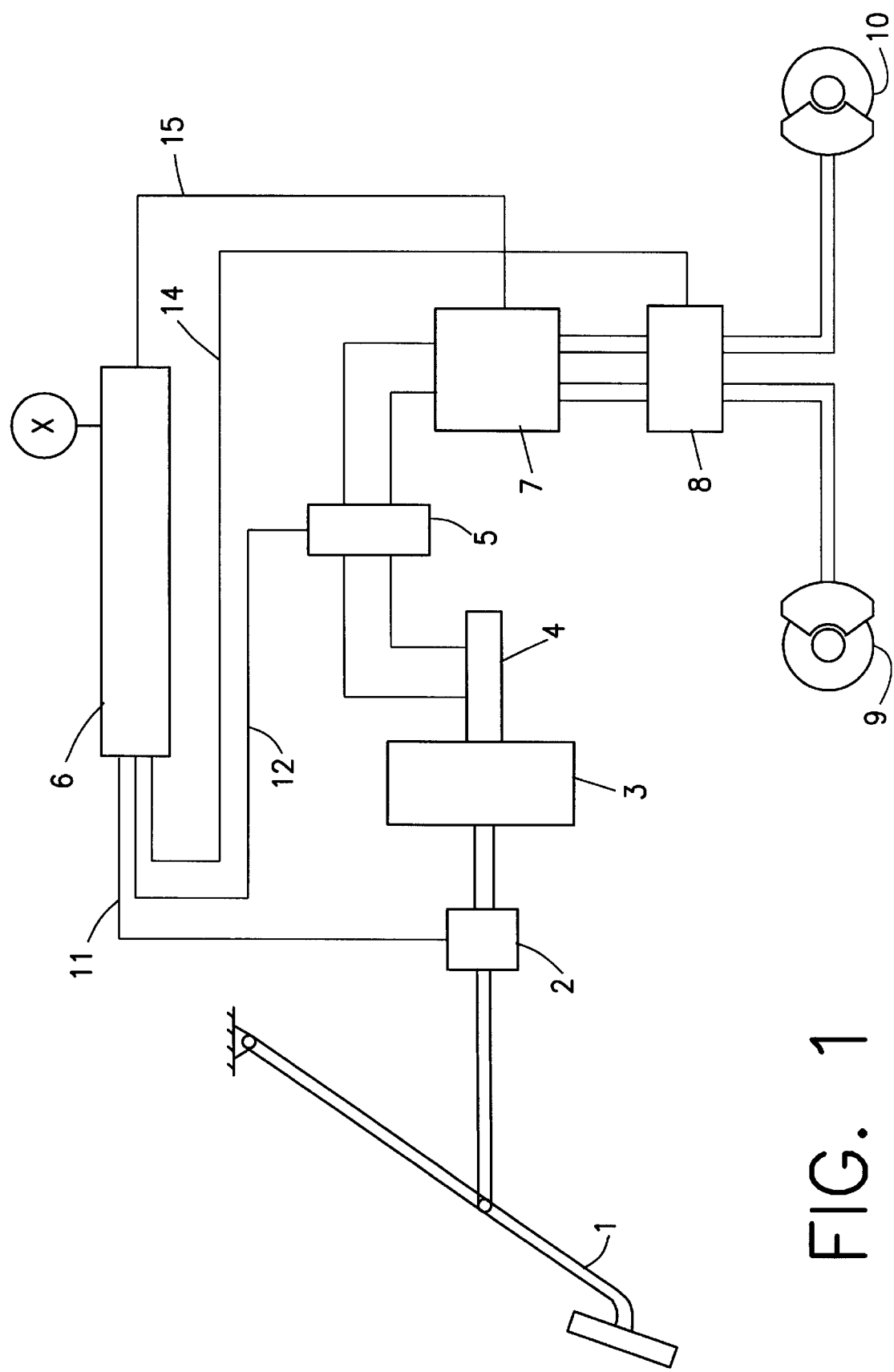
FIG. 1 shows a block diagram of a brake system controlled by an electronic control unit.

FIG. 1 shows a schematic block diagram of a hydraulic brake system. The brake system includes a braking force amplifier 3 with a main brake cylinder 4, with an electronic control unit 6 and with a regulating unit having at least one pump and the usual valves 7. Furthermore, there is provided a force meter 2, which measures the force exerted on brake pedal 1, a pressure sensor 5, which measures the pressure in at least one brake line between the braking force amplifier and the regulating unit, and at least one pressure meter 8, which measures the pressure in one of the brake lines between wheel brakes 9, 10 and the regulating unit 7.

In FIG. 1, the hydraulic lines and the mechanical connections are drawn with thick lines, and the electrical lines with thin lines. For the sake of clarity, the other wheel brakes are not illustrated.

The signal of force meter 2 is supplied to electronic control unit 6 via an input line 11, the signal of pressure meter 5 is supplied to the control unit via an input line 12, and the signal of pressure meter 8 is supplied to the control unit via an input line 14. Control unit 6 actuates the valves and pumps of regulating unit 7 via at least one output line 15.

The force acting on the brake pedal is routed from force meter 2 to control unit 6, where the data of the force meter are compared to that of the pressure meter. If a predefined ratio of the force exerted on the brake pedal to the pressure in the brake line (pressure meter 5) is not observed, the control unit checks, using pressure meter 8, whether sufficient pressure is present in the brake line. If the braking pressure is insufficient, the pressure is increased by pump 7 so that braking can occur without increased use of force. If this protection device has switched on, the driver is given optical and/or acoustic information that the brake system is defective, and he/she must immediately drive to a repair shop.

Figure 2:
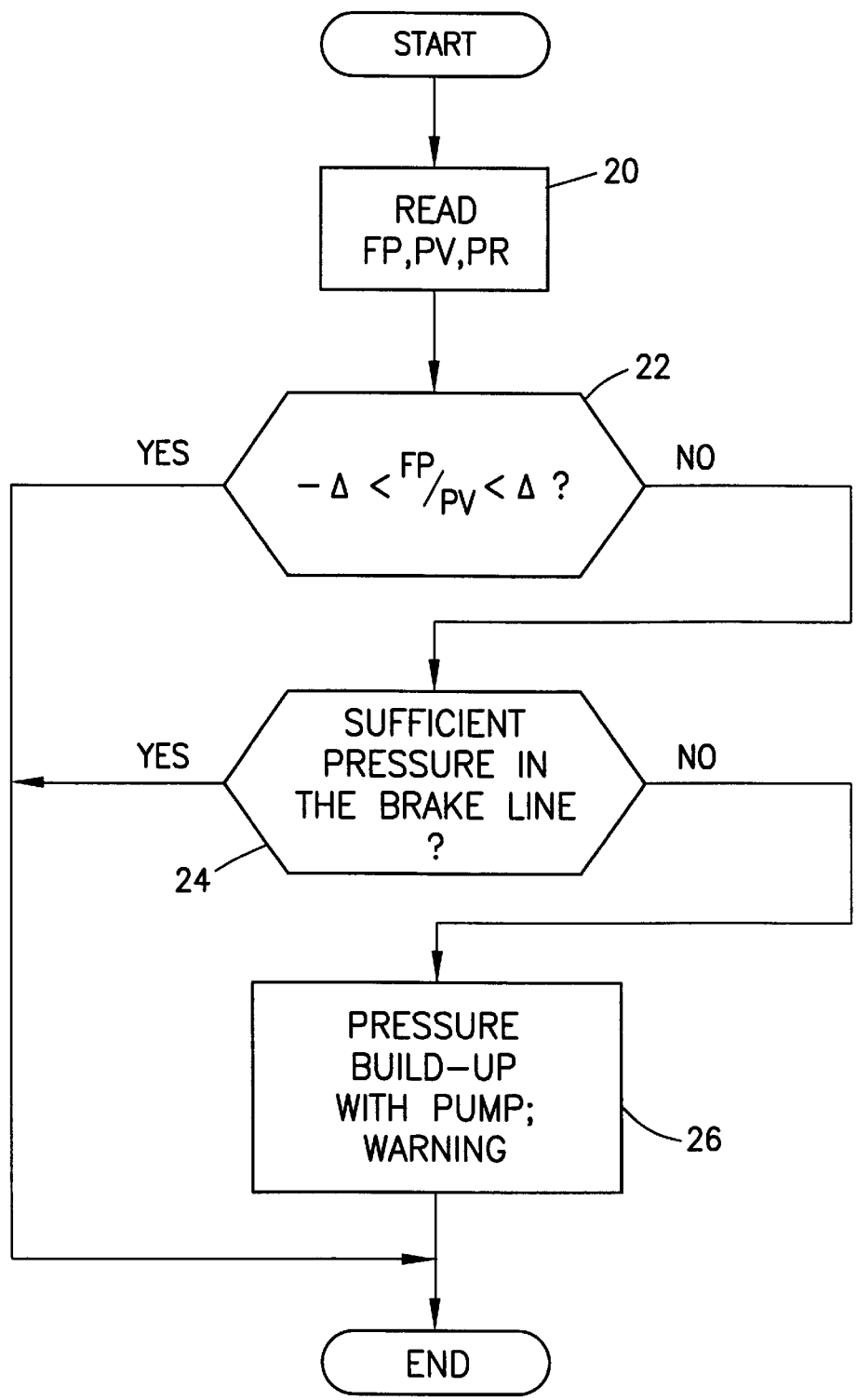
FIG. 2 shows a schematic flow chart for a program running in the control unit for performing the process according to the present invention.

FIG. 2 shows a flow diagram representing a preferred embodiment of the protection device according to the present invention as the program of a microcomputer of control unit 6.

The program outlined here is started at predefined points in time. In the first step 20, the operating parameters such as brake pedal force FP, pre-pressure PV (pressure in one of the brake lines), and wheel brake pressure PR are read. Subsequently, in step 22, it is checked whether the ratio between brake pedal force and pre-pressure is within a predefined tolerance range. If this is the case, then the brake system operates properly, the program is ended and repeated at a given time. If the predefined ratio between braking force and pre-pressure is not observed, it is checked in step 24 whether sufficient pressure is present in the brake line. This check is performed using the wheel brake pressure signal PR. If sufficient pressure has built up in the brake line for braking, the program is ended and repeated at a given time. The brake system works properly in this case regarding the braking effect generated. Otherwise, if the pressure in the pressure line is insufficient, the pump of control unit 7 is activated in step 26. The pump builds up sufficient pressure in the wheel brake cylinder, so that braking is performed without increased application of force on the pedal. At the same time, the driver is notified of the defect in the brake system through a warning light and/or by acoustic means. After step 26, the program is ended and repeated at a given time during braking.

The check in step 24 whether sufficient pressure has built up is performed in the preferred embodiment by comparing the braking pressure with the braking force exerted. The pressure is sufficient if it is basically equal to the expected pressure for the force exerted.

Pressure is built up in step 26 so that a braking pressure such as expected for the corresponding actuating force is generated. The pressure build-up occurs simultaneously in all wheel brakes.

In addition to the use of braking pressure signals for determining the sufficient braking effect, in another embodiment, the vehicle deceleration derived from the wheel speeds is used for the check.

What is claimed is:

1. A process for operating a brake system of a vehicle, comprising the steps of:

measuring an actuation force on a brake pedal using an electronic control unit;

measuring an output pressure on an output side of a braking force amplifier using the control unit;

measuring an actual pressure in a wheel brake of the vehicle using the control unit;

determining a ratio between the actuation force and the output pressure on the output side of the braking force amplifier; and building-up the actual pressure in the wheel brake by actuating a pressure generator using the control unit, when the ratio differs from a predefined ratio and when the actual pressure does not correspond to an expected pressure.

2. The process according to claim 1, wherein the actual pressure does not correspond to the expected pressure when the ratio between the actuation force and the output pressure differs from the predefined ratio.

3. The process according to claim 1, wherein the step of building-up the actual pressure comprises the step of increasing the actual pressure in a brake line connected to the wheel brakes by using a pump such that a braking of the vehicle occurs without increased exertion of force on the brake pedal for actuating the wheel brakes.

4. The process according to claim 1, further comprising the step of providing at least one of an optical notice and an acoustical notice to a driver of the vehicle indicating a defect in the brake system, upon an initiation of the actual pressure being increased.

5. A device for operating a brake system of a vehicle, comprising:

a braking force amplifier coupled to a brake pedal of the vehicle;

a first arrangement for measuring an actuation force on the brake pedal;

a second arrangement for measuring an output pressure on an output side of the braking force amplifier;

a third arrangement for measuring an actual pressure in a wheel brake of the vehicle;

a fourth arrangement for determining a ratio between the actuation force and the output pressure on the output side of the braking force amplifier;

a pressure generator for building-up the actual pressure in the wheel brake of the vehicle, independently of an actuation of the brake pedal; and an electronic control unit for activating the pressure generator to build-up the actual pressure in the wheel brake when the actual pressure in the wheel brake does not correspond to an expected pressure in the wheel brake for the actuation force on the brake pedal and when the ratio differs from a predefined ratio.

* * * * *